United States Patent [19]

Muenker et al.

[11] 3,798,086
[45] Mar. 19, 1974

[54] HIGH-ENERGY SOLID PROPELLANT BINDER

[75] Inventors: Adolf H. Muenker, Somerset; Leland K. Beach, Westfield; Herschel T. White, Montclair, all of N.J.

[73] Assignee: Esso Research and Engineering Company, Linden, N.J.

[22] Filed: Sept. 23, 1966

[21] Appl. No.: 582,207

[52] U.S. Cl............................ 149/19, 149/20, 149/36
[51] Int. Cl.................................................. C06d 5/06
[58] Field of Search.......................... 149/19, 20, 36

[56] References Cited

UNITED STATES PATENTS 3,523,840   8/1970   Bedell.................................. 149/19

*Primary Examiner*—Benjamin R. Padgett

[57] ABSTRACT

Propellant compositions which contain high nitrogen content binders are prepared by reacting liquid polysecondary amines with perchlorates. Powdered aluminum may be added.

2 Claims, No Drawings

HIGH-ENERGY SOLID PROPELLANT BINDER

This invention relates to novel solid propellant composites that utilize high-nitrogen binders. It relates more particularly to a novel oxidizer-binder obtained by reacting a liquid poly-secondary amine, such as polyethylenimine (PEI) with a suitable perchlorate, such as hydrazine diperchlorate (HDP).

The relative merits of solid propellants depend upon a variety of properties, e.g., theoretical specific impulse, burning rate and pressure exponent, thermal stability, density, sensitivity and mechanical properties. For a given propellant system, it is impossible to alter an optimized formulation enough to effect more than a minor improvement in any of the above property areas without adversely affecting one or more of the other properties. Major improvements in several different areas depend, therefore, on the development of new systems utilizing either new propellant ingredients or new combinations of ingredients.

Hydrazine diperchlorate, represented by the formula $N_2H_4 \cdot 2HClO_4$, has been known to be a strong oxidizer exhibiting appreciable impulse and burning rate advantages over ammonium perchlorate (AP). It has been of little use, however, on account of its incompatibility with binders of suitable energy characteristics.

High-nitrogen polymers offer somewhat higher specific impulses and lower flame temperatures than conventional hydrocarbon binders. They suffer in general, however, from poor stability and low density.

A solid propellant of surprisingly high merit—based on tensile strength, specific impulse, thermal stability, burning characteristics, and impact sensitivity—has been obtained in accordance with the present invention by combining polymers of high imino or secondary amino content, as in polyethylenimines, with perchlorates, preferably hydrazine diperchlorate, and aluminum powder.

The resultant oxidizer-binder component formed by the reaction of perchloric acid with the polymer imino groups may be considered to be an ionic polymer or a polymeric salt. The high tensile strength and desirable properties of the propellant are related to the proportions of —NH— and $HClO_4$ reacted.

The typical polymer of high imino (—NH—) content that was found suitable for making the improved solid propellant is low average molecular weight (low viscosity) polyethylenimine.

Polyethylenimine may be obtained, in a manner known in the art, by introducing into an aqueous solution of ethylenimine either carbon dioxide or an inorganic acid such as sulfuric acid. The polymers produced in this manner are so viscous, however, that they do not form homogeneous propellant composites with HDP and Al. Therefore, they are not preferred for use in the present invention.

The preferred polyethylenimines have average molecular weights of about 300 to 1,000, flow readily at room temperature, and can be formulated easily with solid ingredients such as HDP and Al to produce homogeneous, high tensile strength solid propellants. These polymers are made either by using an organic acid such as acetic acid as the catalyst or by using molecular weight modifiers as coreactants. Primary or secondary acyclic amines having a carbon-to-nitrogen ratio $\leq 2$, particularly ethylene diamine, are preferred modifiers for controlling the average molecular weight of polyethylenimines. Such organic modifiers which function as either chain initiators or chain terminators are used in relatively small amounts, e.g., 1 to 20 mole percent based on the ethylenimine monomer.

The effect of modifier, such as ethylenediamine in the polymerization is illustrated in the following table:

TABLE I

POLYMERIZATION OF ETHYLENIMINE AT 0°C., $CO_2$ CATALYST

| Solvent, Vol. % | Modifier Ethylene Diamine Mole % | Polymer Molecular Weight |
|---|---|---|
| $H_2O$, 50 | 4 | 850 |
| $H_2O$, 50 | 8 | 550 |
| $H_2O$, 50 | 18 | 350 |

All polymeric products were vacuum stripped and therefore cannot contain oligomers, dimers and trimers.

Each of the polymer products were fluid and suitable for preparing the ionic polymers with hydrazine diperchlorate.

The preferred PEI's may have a bimodal molecular weight distribution, e.g., from blending high and low average molecular weight polymers to meet viscosity specifications. In fact, at a given polymer average molecular weight or viscosity, the tensile strength of the solid propellant product is enhanced by the inclusion of high ends introduced through polymer blending.

Many of the polyethylenimine products were formulated with hydrazine diperchlorate and aluminum to determine their characteristics and potential use as high-energy solid propellants. The formation of such propellants and their properties are set forth in the following examples:

EXAMPLE 1

In the initial tests, fluid ethylenimine homopolymers in the average molecular weight range of 250 to 850 were mixed under ambient conditions of temperature with hydrazine diperchloriate, and aluminum powder, to obtain a stiff putty. The putty turned into a thin mixture which then hardened into a high tensile strength solid material. The curing of the formulation is unique in that no crosslinker is required.

The high tensile strength may be due to ionic crystal-type bonds which interlink the polymer chains.

An optimum formulation contained:
- 17 wt. percent polyethylenimine
- 63 wt. percent hydrazine perchlorate
- 20 wt. percent aluminum powder This optimum formulation was tested and compared in many ways with other formulations and has a theoretical specific impulse of 274 seconds.

The thermal stability of the propellant was surprisingly good. Vacuum thermal stability tests at 60°C. and 90°C. showed no measurable gassing over 120 hrs. Thermogravimetric analysis showed no measurable weight loss up to 210°C. Auto-ignition tests indicated a 5-second ignition delay at 312°C. as contrasted to lower temperatures for the same test on nitroglycerin (222°C.), hydrazine nitroformate (165°C.) and other explosives.

The sensitivity tests of the propellant showed it compared favorably with existing, lower-energy propellants. It showed impact sensitivity of 23 kg-cm compared to 19 kg-cm for a double base type propellant.

The burning characteristics of the propellant have been found excellent, e.g., burning rate of 1.3 inches/sec. at 800 psi.

EXAMPLE 2

The effect of molecular weight of the polyethylenimine on tensile strength of the total formulation was demonstrated by preparing formulations containing polyethylenimines of different molecular weights. The following composition was used in all formulations:

25 wt. percent polyethylenimine
58 wt. percent hydrazine diperchlorate
17 wt. percent aluminum When low viscosity polyethylenimines of 300 to 1,200 molecular weight were mixed with hydrazine diperchlorate and aluminum, the mixtures are liquefied and then set to a strong solid propellant. Mixtures made with higher viscosity polyethylenimines (1,500–2,400 average molecular weight), however, did not go through the fluid stage and, hence, could not be molded. Within the useful range of polyethylenimine viscosities (350–850 average molecular weight) tensile strength of the propellant increased with increase in the molecular weight of the polyethylenimine as follows:

TABLE II

| Average Molecular Weight* | Tensile, No./in.$^2$ |
|---|---|
| 830 | 317 |
| 545 | 230 |
| 351 | 130 |

* Measured in MeOH solution with a Mechrolab Osmometer.

EXAMPLE 3

Two polyethylenimine, hydrazine diperchlorate, aluminum formulations were prepared with 600 average molecular weight polymers. The composition was the same as in Example 2, namely, 25 wt. percent polyethylenimine, 58 wt. percent hydrazine diperchlorate and 17 wt. percent aluminum. In one case the polyethylenimine was the product of a single polymerization run, in the other case the polymer comprised a blend of 350 average molecular weight polyethylenimine and 1,950 average molecular polyethylenimine. The blended polymer which had a broader molecular weight distribution, produced a stronger propellant as shown below:

TABLE III

| 600 Average Molecular Weight Polyethylenimine | Tensile Strength No./in.$^2$ |
|---|---|
| Blended from 1950 and 350 average molecular weight | 336 |
| As produced | 250 |

EXAMPLE 4

A formulation containing 25 wt. percent polyethylenimine, 58 wt. percent hydrazine diperchlorate and 17 wt. percent aluminum was prepared and strands thereof were burned at a series of pressures to determine the effect of pressure on burning rate. The following burning rates were measured.

TABLE IV

| Pressure, psig $N_2$ | Burning Rate, inches/sec. |
|---|---|
| 100 | 0.41 |
| 200 | 0.45 |
| 400 | 0.85 |
| 600 | 0.87 |
| 800 | 1.3 |

This formulation had a pressure exponent of 0.4 to 0.5 and an impact sensitivity of 35 kg-cm.

What is claimed is:

1. A composition comprising a poly-secondary amine polymer combined with perchlorate ions in a tough solid mixture containing 10 to 40 wt. percent polymers of ethylenimine having average molecular weights of 350 to 850 as the poly-secondary amine polymer combined with 60 to 90 wt. percent of hydrazine diperchlorate which supplies the perchlorate ions.

2. A composition comprising polyethylenimine combined with perchlorate ions supplied by the presence of hydrazine perchlorate and containing 0 to 25 wt. percent of aluminum powder.

* * * * *